W. KIESER.
SHAFT BEARING.
APPLICATION FILED APR. 8, 1908.

1,108,761.

Patented Aug. 25, 1914.

Witnesses:

Inventor,
Walter Kieser,
By Albert G. Davis,
Att'y.

UNITED STATES PATENT OFFICE.

WALTER KIESER, OF BERLIN, GERMANY, ASSIGNOR TO GENERAL ELECTRIC COMPANY, A CORPORATION OF NEW YORK.

SHAFT-BEARING.

1,108,761.  Specification of Letters Patent. Patented Aug. 25, 1914.

Application filed April 8, 1908. Serial No. 425,813.

*To all whom it may concern:*

Be it known that I, WALTER KIESER, a citizen of Switzerland, residing at Berlin, Germany, have invented certain new and useful Improvements in Shaft-Bearings, of which the following is a specification.

In bearings for rapidly rotating shafts such as are employed in steam turbines, engines and other machines, the surface of the bearing structure is often not of sufficient extent to keep the bearing cool by the radiation therefrom of the heat generated by the friction of the bearing surfaces.

In order to maintain the temperature of the bearing within safe and proper limits, resort must be had to cooling by the circulation of some medium over the radiating surfaces to absorb and remove said heat.

The present invention has for its object the cooling of such bearings by circulating the lubricant for the bearing surfaces through the body of the bearing. This arrangement results in the effective control of the temperature and is attended with many other incidental advantages which are set forth in the description which follows.

Figure 1:
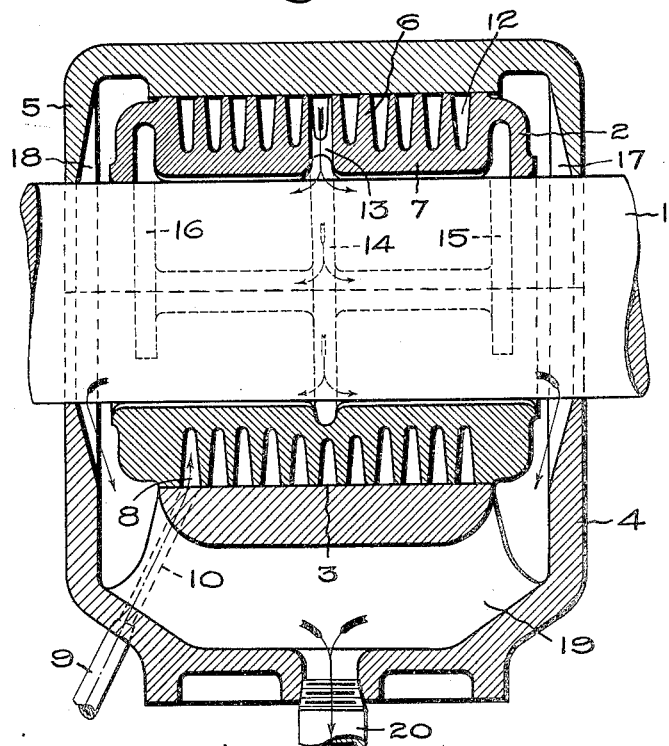
Figure 2:
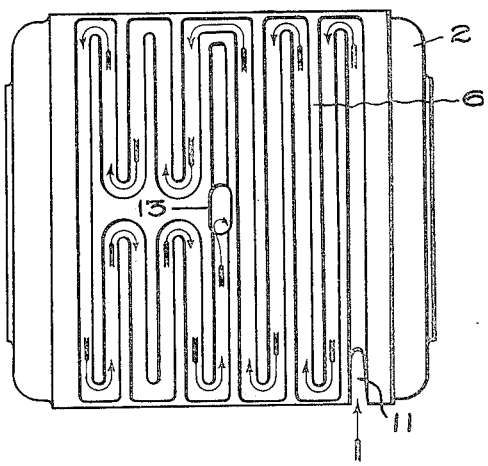

In the accompanying drawing, which illustrates one of the embodiments of my invention, Figure 1 is a vertical section through a bearing; and Fig. 2 is a top view of the bearing shell or box.

The shaft 1 rotates in a shell or box 2 which is supported by a seat 3 formed in the bearing frame 4 and a cap 5 which is suitably secured to the frame and holds the shell in place while at the same time permitting it to be removed when the cap is taken off. In the form of the invention illustrated, the seat 3 is circular in cross section and the outer surface of the shell is of similar shape. The shell itself is shown as made in two parts by dividing it in a horizontal plane extending through the axis of the shaft, but the shape of the outer surface of the shell and its seat, and also the number of parts into which the shell is divided as well as the location of the plane or planes of division may all be varied to suit the conditions of any given machine in which the bearing is used. The shell is provided with a number of external flanges or ribs 6 which support it on the seat 3 and assist in the radiation of the heat imparted to the relatively thin body portion 7 of the shell by the friction between the shaft and its bearing surface. The outer edges of these circular flanges are in contact with the surface of the seat, thus forming a conduit or channel between the flanges and said surface. The amount of metal to be removed by machining is also reduced by this flanged structure. By suitably arranging the ribs or flanges, this channel or conduit is made to follow a winding or tortuous path through or over the shell. The outline of this path may be that of a helix or it may have a zigzag shape or the form shown in the drawing, the object being merely to secure a circulation of the cooling medium over a sufficiently large radiating surface formed by the walls of the conduit or channel so that the heat due to friction will be effectively removed.

In the drawing, lubricant from a suitable source is supplied to the channel or conduit 8 in the lower half of the shell by the pipe 9 and passage 10. It flows back and forth over the radiating surfaces of the shell and is delivered by the passage 11 to the channel or conduit 12 in the upper half of the shell. This conduit directs it back and forth over the radiating surfaces in the manner indicated in Fig. 2 and delivers it to the passage 13 which leads inwardly to the shaft at the center of the bearing surfaces. Grooves 14, 15 and 16 in the bearing surfaces of the shell assist in the distribution of lubricant over the bearing surfaces. After flowing over said bearing surfaces, the lubricant escapes at the ends of the shell into suitable chambers 17 and 18 formed between said ends and the walls of the frame and its cap and flowing thence downward into a chamber 19 in the lower part of the frame, a conduit 20 drains it from the bearing and preferably returns it to the source of supply for repeated use. Between the conduit 20 and said source, the lubricant may be cooled by any well known device and filtered, if desirable or necessary, so that it will again be in condition to effectively absorb heat from the bearing and lubricate its bearing surfaces.

It will be noted that before the oil is delivered to the bearing surfaces its temperature is raised by the heat which it removes from the bearing in the cooling operation. The lubricating effect of the oil is increased by this pre-heating, warm oil being a better lubricant than cold oil, so that the friction of the bearing surfaces is decreased, resulting in a superior operation of the bearing and a reduction of the amount of heat to be removed by the oil. The combined result of the efficient removal of the heat and the decrease in the amount of heat generated, is that a given bearing may be made to carry a much heavier load without overheating, or the dimensions of a bearing for a given load may be correspondingly reduced. By forming the circulating conduits or channels in the manner described they are easily manufactured and can be readily cleaned of molding sand and cleansed and kept free from dirt during the operation of the bearing. In this respect they are much superior to conduits which are so formed as to be comparatively inaccessible for inspection and cleansing. While my invention is described above as applied to the form of bearing shown in the drawing, it must be regarded as broad enough in its scope to cover a bearing structure having a reversed arrangement in which the radiating ribs or flanges are formed as a part of the cap and frame instead of being constructed specifically as illustrated.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a shaft, a shaft bearing comprising bearing surfaces which receive the shaft, a series of cooling surfaces for radiating the heat generated by friction between the shaft and the bearing surfaces, a conduit extending between one end of the cooling surfaces and the bearing surfaces, and means for supplying lubricating oil from a suitable source to flow in series over the cooling surfaces, through the connecting conduit and over the bearing surfaces to lubricate the bearing and to cool said bearing by absorbing and conveying heat from the cooling surfaces.

2. In combination, a shaft, a bearing therefor which receives a continuous supply of lubricating oil for the bearing surfaces from a suitable source, said bearing having cooling surfaces which surround the shaft outside of the bearing surfaces and over which the whole of said oil supply is circulated both above and below the shaft, said oil cooling the bearing by absorbing and removing heat generated by the friction of said bearing surfaces, and a conduit means that receives all of the oil from the cooling surfaces after it is heated and conveys the same to the space between the shaft and the bearing.

3. In combination, a shaft, a bearing therefor which receives lubricating oil from a suitable source of supply, said bearing having cooling surfaces arranged above and below the shaft over which all of said lubricating oil is circulated adjacent the bearing surfaces both above and below the shaft to raise its temperature by heat generated by the friction between the shaft and said bearing surfaces before it is delivered to said surfaces, and conduit means connecting the portions of said cooling surfaces that are located above and below the shaft respectively in series with the shaft bearing surfaces.

4. In combination, a shaft, a divided bearing shell therefor which receives lubricating oil from a suitable source, each of the bearing parts being provided with walls over which the lubricating oil flows to be heated by absorbing therefrom heat generated by the friction between the shaft and bearing surfaces before its delivery to said surfaces, conduit means for conveying all of the oil from one part of the shell to another and delivering it to the shaft bearing surfaces, a casing for the bearing having a chamber that receives the oil from the ends of the shell, and a conduit for conveying the oil from the casing.

5. In combination, a shaft, a divided bearing shell therefor, each part of the shell being provided with a conduit to receive lubricating oil, means for supplying oil to the parts of the bearing and causing it to pass serially through said parts, a conduit that receives the oil after it has passed through said parts and conveys it inwardly to the shaft, a casing for the bearing having chambers at ends of the shell that receive oil from the shaft, and a conduit which conveys oil from the casing.

6. In combination, a shaft, a bearing therefor provided with heat radiating ribs or flanges forming between them a tortuous conduit or channel which receives lubricating oil from a suitable source and circulates it through the bearing to absorb heat generated by the friction of the bearing surfaces before delivering it to said surfaces to lubricate them, a conduit connecting the outlet portion of said tortuous conduit with the bearing surfaces, a conduit for conveying the oil from the bearing, and a casing which supports said conduits.

7. In combination, a shaft, a bearing therefor which receives a continuous supply of lubricating oil for the bearing surfaces from a suitable source, said bearing comprising a frame, a shell having its inner surface in engagement with the shaft which is mounted in the frame and provided with a conduit for circulating said oil through the body of the shell to cool the bearing by absorbing and removing the heat generated by the friction of the bearing surfaces, a conduit connecting the outlet portion of the first conduit with the bearing surfaces, and a conduit for conveying the oil from the bearing.

8. In combination, a shaft and a bearing therefor which receives lubricating oil for the bearing surfaces from a suitable source of supply, said bearing comprising a frame, a shell having its inner surface in running engagement with the shaft which is mounted in the frame and provided with heat radiating ribs or flanges on its outer surface forming between them a tortuous conduit or channel through which said oil is circulated to cool the bearings by absorbing heat from the surfaces of the flanges and a conduit connecting the end of the tortuous conduit with said bearing surfaces.

9. In combination, a shaft and a bearing therefor comprising a frame, a shell having its inner surface in running engagement with the shaft which is mounted in the frame and provided with heat radiating flanges on its outer surface forming between them and the abutting surface of the frame a tortuous conduit or channel which receives lubricating oil from a suitable source, circulates it about said shell to cool the bearing by absorbing the heat generated by the friction of the bearing surfaces, and a conduit leading from the end of said tortuous conduit which delivers the oil so heated to said surfaces.

10. In combination, a shaft, a bearing therefor comprising a frame, a cap, a shell formed in halves and secured in the frame by the cap, the inner surface of the shell being in running engagement with the shaft, ribs or flanges on each half of the shell which form between them and the abutting surface of the frame tortuous channels or conduits, a passage connecting the conduit in the lower half with the conduit in the uppper half of the shell, and a passage leading from the end of the conduit in the upper half to the center of the bearing surface of the shell, means supplying lubricant from a suitable source to the conduit in the lower half of the shell to flow through said conduit, the first passage, the conduit in the upper half of the shell and the second passage to the center of said bearing surface and thence outward to the ends of the shell, and a conduit for conveying lubricant away from the bearing.

11. In combination, a shaft, a bearing therefor comprising a frame having a cap and a circular seat formed in the frame and cap, a circular shell made in sections and mounted in said seat, a plurality of ribs or flanges on each section intermediate the ends of the seat which form between them and the abutting surface of said seat a tortuous conduit for circulating lubricant from a suitable source about the shell to cool it by absorbing the heat generated by the friction of the bearing surfaces, a conduit receiving the lubricant so heated and conveying it to the adjacent surfaces of the shaft and shell from which it flows outward to the ends of the shell, there being a chamber in the lower portion of the frame which receives the lubricant flowing from the ends of the shell, and a conduit for conveying lubricant away from said chamber.

In witness whereof, I have hereunto set my hand this 21st day of March, 1908.

WALTER KIESER.

Witnesses:
  GEORG FORNER,
  OTTO VOM HAUEL.

---

Copies of this patent may be obtained for five cents each, by addressing the " Commissioner of Patents, Washington, D. C."